US007074688B2

(12) United States Patent
Kurihara et al.

(10) Patent No.: US 7,074,688 B2
(45) Date of Patent: Jul. 11, 2006

(54) METHOD OF MAKING AN ELECTRODE FOR AN ELECTROCHEMICAL CAPACITOR AND THE METHOD OF MAKING AN ELECTROCHEMICAL CAPACITOR

(75) Inventors: Masato Kurihara, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 207 days.

(21) Appl. No.: 10/877,997

(22) Filed: Jun. 29, 2004

(65) Prior Publication Data

US 2005/0081350 A1 Apr. 21, 2005

(30) Foreign Application Priority Data

Jun. 30, 2003 (JP) .......................... P2003-188277

(51) Int. Cl.
*H01L 21/20* (2006.01)
(52) U.S. Cl. ...................... 438/381; 438/239; 438/393
(58) Field of Classification Search ............... 438/381, 438/239, 240, 250, 393, 396, 399; 429/217, 429/231.7; 361/516
See application file for complete search history.

(56) References Cited

U.S. PATENT DOCUMENTS 5,621,607 A * 4/1997 Farahmandi et al. ........ 361/502
2002/0164429 A1 * 11/2002 Gaillard et al. .......... 427/376.2
2004/0072075 A1 * 4/2004 Tsukamoto et al. ...... 429/231.7

FOREIGN PATENT DOCUMENTS

JP 10-092432 A 4/1998
JP 2000-223121 A 8/2000

* cited by examiner

*Primary Examiner*—Kevin M. Picardat
(74) *Attorney, Agent, or Firm*—Oliff & Berridge, PLC

(57) ABSTRACT

The present invention provides a method of making an electrochemical capacitor electrode comprising a collector and an electronically conductive porous layer formed on the collector while keeping an electric contact therewith. The porous layer contains at least a porous particle made of a carbon material having an electronic conductivity and a binder capable of binding the porous particle. The method comprises a plasma processing step of subjecting a material to high-frequency thermal plasma processing in a plasma gas atmosphere so as to yield the porous particle. All the manufacturing steps subsequent to the plasma processing step are carried out in an inert gas atmosphere.

8 Claims, 18 Drawing Sheets

*Fig.11*
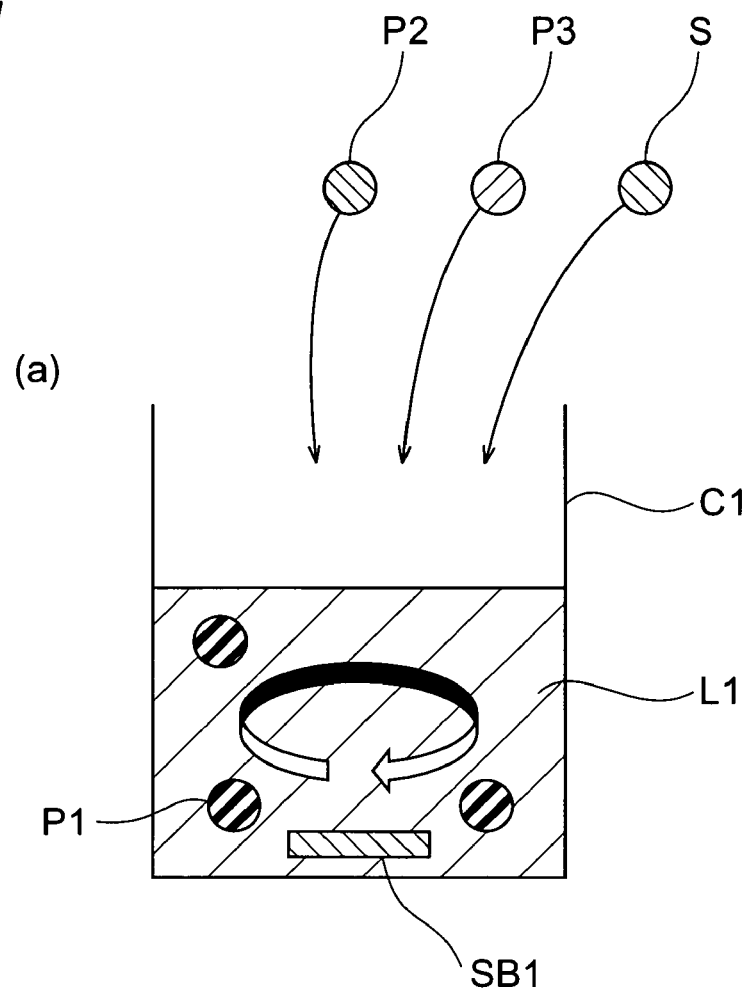
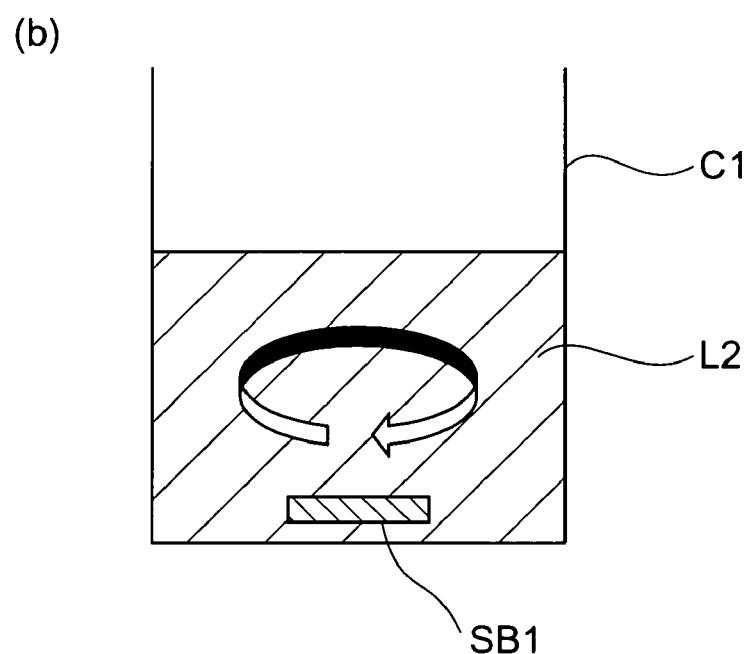

METHOD OF MAKING AN ELECTRODE FOR AN ELECTROCHEMICAL CAPACITOR AND THE METHOD OF MAKING AN ELECTROCHEMICAL CAPACITOR

BACKGROUND OF THE INVENTION

1. Field of the Invention

The present invention relates to a method of making an electrode for an electrochemical capacitor such as an electric double layer capacitor, and a method of making an electrochemical capacitor.

2. Related Background Art

Electrochemical capacitors such as electric double layer capacitors can easily achieve a smaller size and a lighter weight, and thus are expected to become power supplies or backup power supplies for portable devices (small-size electronic devices), auxiliary power supplies for electric cars and hybrid cars, etc., for example. Therefore, various studies have been under way in order to further improve their performances (capacities, voltage resistance characteristics, cycle characteristics, and stability during high-temperature storage). For further improving performances of electrochemical capacitors, electrodes in the electrochemical capacitors are also desired to improve their performances.

As a technique for making an electrochemical capacitor electrode and electrochemical capacitor in order to further improve characteristics of the electrode and the electrochemical capacitor equipped therewith, one subjecting a carbon material (after activation, such as activated carbon), which becomes an electrode active material, to thermal plasma processing and purifying the surface of the carbon material has been proposed in order to lower irreversible capacity in particular (see, for example, Japanese Patent Application Laid-Open Nos. HEI 10-92432 and 2000-223121).

Though no detailed mechanisms have been elucidated, electrochemical characteristics of electrochemical capacitors such as reversible capacity, voltage resistance characteristics, cycle characteristics, and stability during high-temperature storage are known to be greatly affected by the degree of crystallization (degree of graphitization), surface form, internal structure, surface chemical composition, absorbed moisture amount, and the like of particles made of a carbon material to become an electrode active material in general. Also, the amount of oxygen-containing functional groups such as carboxyl and carbonyl groups on particle surfaces of the carbon material is known to have a strong influence on the electrochemical characteristics.

The above-mentioned technique aims at purifying the surface of the carbon material to become an electrode active material and allowing the surface to attain physical and chemical states suitable for yielding sufficient electrochemical characteristics by thermal plasma processing.

SUMMARY OF THE INVENTION

However, techniques for making an electrode and an electrochemical capacitor equipped therewith by using thermal plasma processing, such as the technique disclosed in Japanese Patent Application Laid-Open Nos. HEI 10-92432 and 2000-223121 mentioned above, still leave a room for improvement, since electrochemical characteristics, i.e., reversible capacity, voltage resistance characteristics, cycle characteristics, and stability during high-temperature storage of the resulting electrochemical capacitors, have not been sufficient yet.

It is an object of the present invention to provide a method of making an electrochemical capacitor electrode and a method of making an electrochemical capacitor, which can construct an electrochemical capacitor excellent in reversible capacity, voltage resistance characteristics, cycle characteristics, and stability during high-temperature storage.

As a result of diligent studies for achieving the above-mentioned object, the inventors have found that one of major reasons why the electrochemical capacitor electrodes and electrochemical capacitors made by the techniques for making them by using thermal plasma processing fail to yield sufficient electrochemical characteristics lies in that the carbon material with a purified surface is exposed to an atmosphere such as air which contains moisture, oxygen, and optionally organic compounds in the steps of making the electrode and electrochemical capacitor after plasma processing.

Namely, in the conventional techniques using thermal plasma processing, the carbon material with the purified surface is exposed to an atmosphere such as air which contains moisture, oxygen, and optionally organic compounds. The inventors have found that moisture newly adheres to the purified surface of the carbon material after plasma processing, and a reaction with oxygen (in which organic compounds may involve when present) advances on the surface, so that the oxygen-containing functional groups combine with the surface, whereby the improvement in electrochemical characteristics by plasma processing is not sufficiently obtained as expected.

In the case where moisture adheres to the carbon material in the electrode, for example, water is easily decomposed when a voltage is applied to the electrochemical capacitor, which causes an irreversible capacity to occur, thereby lowering cycle characteristics. When a gas generated by the decomposition of water exists or when water exists as steam in the electrode, no sufficient electric double layer can be formed, whereby capacity decreases. When moisture (liquid or solid) adheres to the electrode, it increases impedance, thereby lowering cycle characteristics. A small amount of moisture in the electrode promotes a decomposition reaction of a nonaqueous electrolytic solution at a high temperature (45° C. or higher) in particular, whereby the stability during storage at a high temperature (45° C. or higher) deteriorates in particular. When oxygen-containing functional groups exist, no sufficient electric double layers can be formed, whereby the capacity decreases.

For example, among carbon materials subjected to high-frequency plasma processing, those left for 2 hours in the air (at a temperature of 25° C. and a relative humidity of 45%) were measured with a thermal desorption mass analyzer (TDS) by the inventors, whereby a large amount of a gas derived from hydroxyl group was seen to occur from the carbon material surface.

As a result of further studies, the inventors have found it quite effective to carry out all the steps of making an electrode and an electrochemical capacitor after the plasma processing within an inert gas atmosphere in order to achieve the above-mentioned object, thereby accomplishing the present invention.

Namely, in one aspect, the present invention provides a method of making an electrochemical capacitor electrode comprising a collector and an electronically conductive porous layer formed on the collector while keeping an electric contact therewith, the porous layer containing at least a porous particle made of a carbon material having an electronic conductivity and a binder adapted to bind the porous particle; the method comprising a plasma processing step of subjecting a material to high-frequency thermal plasma processing in a plasma gas atmosphere so as to yield the porous particle, wherein all the manufacturing steps subsequent to the plasma processing step are carried out in an inert gas atmosphere. In another aspect, the present invention provides a method of making an electrochemical capacitor electrode, the method comprising a plasma processing step of subjecting a material made of a carbon material having an electronic conductivity to high-frequency thermal processing in a plasma gas atmosphere so as to yield a porous particle, and a porous layer forming step of forming an electronically conductive porous layer on a collector by using the porous particle and a binder adapted to bind the porous particle, wherein the porous layer forming step is carried out in an inert gas atmosphere.

In the present invention, "inert gas" refers to noble and nitrogen gases. On the other hand, "inert gas atmosphere" refers to an atmosphere in which the inert gas content is at least 99.9%, preferably at least 99.9% and having a relative humidity is not greater than 0.5% (a dew point of −40° C. or lower), still more preferably not having a relative humidity greater than 0.04% (a dew point of −60° C. or lower); the oxygen content is not greater than 10 ppm, preferably not greater than 1 ppm. The "inert gas atmosphere" in all the steps subsequent to the plasma processing step can be realized by carrying out all the steps subsequent to the plasma processing step in a dry room or glove box.

By carrying out all the manufacturing steps (e.g., porous layer forming step) after the plasma processing step in an inert gas atmosphere as mentioned above, the methods of making an electrochemical capacitor electrode can form an electrode while purifying the surface of the carbon material, which becomes an electrode active material, and allowing the surface to keep physical and chemical states suitable for attaining sufficient electrochemical characteristics by plasma processing.

Here, "high-frequency thermal plasma" is a plasma generated from a middle pressure (about 10 to 70 kPa) to 1 atm. Unlike normal low-pressure plasmas, a plasma approximating a thermal equilibrium is obtained, whereby not only local reactions are effected by the plasma or the like, materials existing in the system can attain a high temperature. Therefore, the high-frequency thermal plasma enables both the generation of a high-temperature phase and the surface modification. Examples of specific phenomena include the nitrification of the surface when using $N_2$ as a plasma gas, hydrogenation of the surface when using $H_2$, physical destruction at an atomic level, and cleaning of particle surfaces.

When the high-frequency thermal plasma is used for surface processing of a particle made of a carbon material, the "material" (carbon material or resin material) of the particle made of a carbon material is graphitized by ultra-high-temperature processing using a high-frequency thermal plasma atmosphere, and the surface is bombarded with ions, radicals, etc., so as to be modified.

Because of such high-frequency thermal plasma processing, the carbon material to become a constituent material of an electrode obtained by the methods of making an electrochemical capacitor electrode in accordance with the present invention has a turbostratic structure near the material surface, and a minute amount of oxygen or hydrogen existing on the material surface may react with the surface, so as to introduce a new functional group, so that a surface state suitable for yielding a sufficient electrochemical characteristic seems to be realized.

Therefore, the manufacturing methods of the present invention can easily and reliably yield an electrochemical capacitor electrode which can construct an electrochemical capacitor excellent in reversible capacity, voltage resistance characteristics, cycle characteristics, and stability during high-temperature storage.

In still another aspect, the present invention provides a method of making an electrochemical capacitor comprising first and second electrodes opposing each other; an insulating separator disposed between the first and second electrodes so as to be adjacent thereto; a nonaqueous electrolytic solution; and a case accommodating therein the first electrode, second electrode, separator, and nonaqueous electrolytic solution in a closed state; wherein at least one of the first and second electrodes is made by the above-mentioned method of making an electrochemical capacitor electrode; and wherein all the manufacturing steps are carried out in an inert gas atmosphere. In still another aspect, the present invention provides a method of making an electrochemical capacitor comprising first and second electrodes opposing each other; an insulating separator disposed between the first and second electrodes so as to be adjacent thereto; a nonaqueous electrolytic solution; and a case accommodating therein the first electrode, second electrode, separator, and nonaqueous electrolytic solution in a closed state; the method comprising an electrode forming step of forming the first and second electrodes; and an accommodating step of accommodating the first electrode, second electrode, separator, and nonaqueous electrolytic solution such that the separator is disposed between the first and second electrodes and closing the case so as to yield the electrochemical capacitor; wherein at least one of the first and second electrodes is made in the electrode forming step by the above-mentioned method of making an electrochemical capacitor electrode; and wherein the accommodating step is carried out in an inert gas atmosphere.

When the electrode made by the above-mentioned method of making an electrochemical capacitor electrode in accordance with the present invention is used as at least one, preferably both of the first and second electrodes, while all the manufacturing steps (e.g., the above-mentioned accommodating step) are carried out in an inert gas atmosphere, an electrochemical capacitor can be formed while purifying the surface of the carbon material, which becomes an electrode active material, and allowing the surface to keep physical and chemical states suitable for attaining sufficient electrochemical characteristics by plasma processing. Therefore, the methods of making an electrochemical capacitor in accordance with the present invention can easily and reliably yield an electrochemical capacitor which can construct an electrochemical capacitor excellent in reversible capacity, voltage resistance characteristics, cycle characteristics, and stability during high-temperature storage.

In the present invention, a laminate in which the first electrode, separator, and second electrode opposing each other are successively laminated in this order is referred to as "matrix". This matrix may be not only one having a three-layer structure (composed of the first electrode, separator, and second electrode), but also one constituted by five or more layers in which electrodes (first or second electrodes) and separators are alternately laminated so as to exhibit functions of a capacitor.

In the present invention, "nonaqueous electrolytic solution" refers to a nonaqueous electrolytic solution usable in an electrochemical capacitor such as electric double layer capacitor. The "nonaqueous electrolytic solution" may be not only in a liquid state but also be a gel-like electrolyte obtained by adding a gelling agent thereto.

BRIEF DESCRIPTION OF THE DRAWINGS

FIG. 11 is an explanatory view for explaining a coating liquid preparing step of preparing an electrode forming coating liquid;

DESCRIPTION OF THE PREFERRED EMBODIMENTS

In the following, a preferred embodiment of the manufacturing method of the present invention will be explained in detail with reference to the drawings. In the following explanation, parts identical or equivalent to each other will be referred to with numerals identical to each other without repeating their overlapping descriptions.

Figure 1:
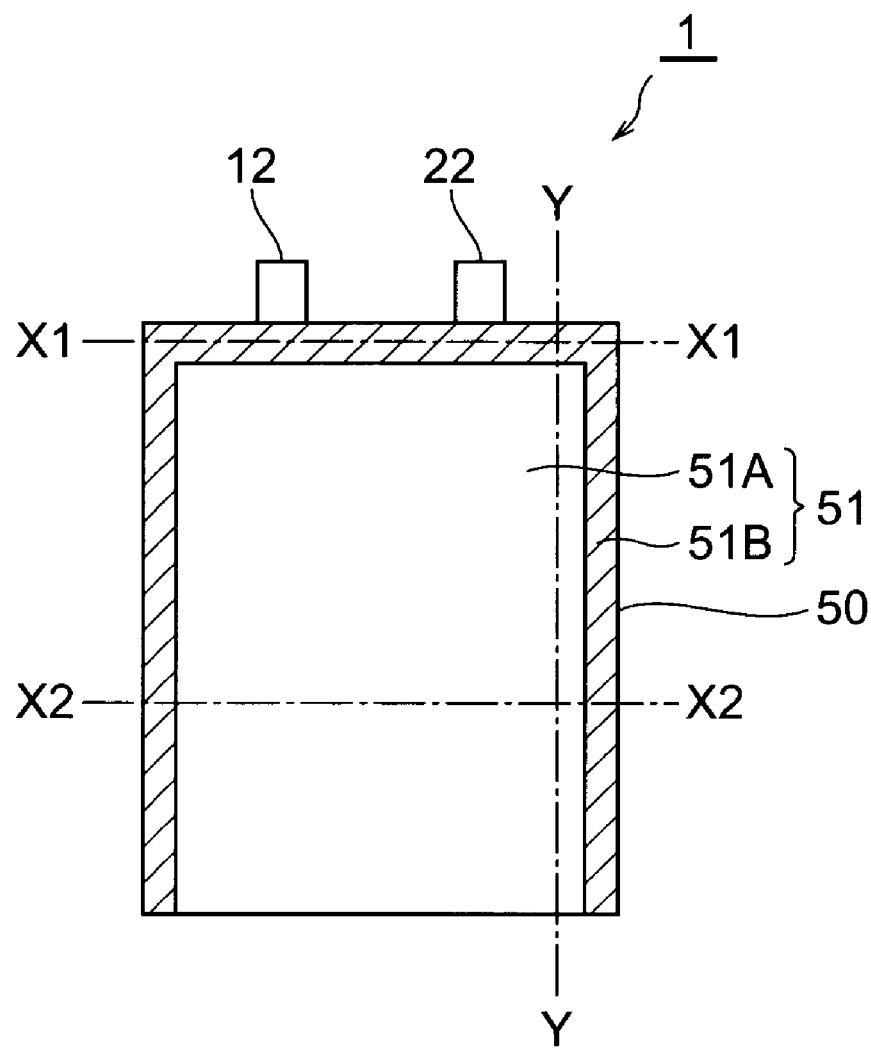
FIG. 1 is a front view showing an example of the electrochemical capacitor (electric double layer capacitor) made by a preferred embodiment of the manufacturing method of the present invention.
Figure 2:
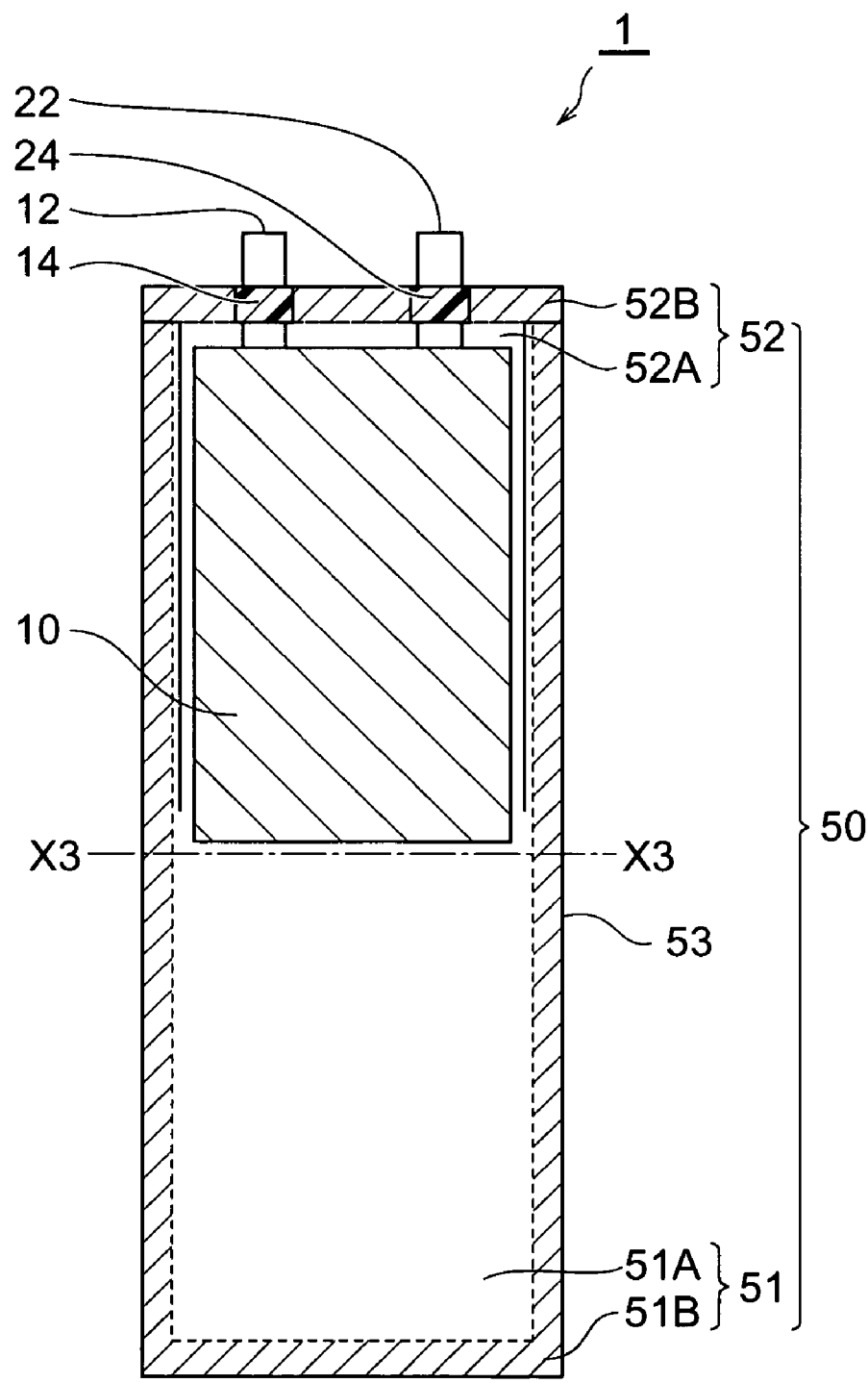
FIG. 2 is a developed view showing the inside of the electrochemical capacitor (electric double layer capacitor) shown in FIG. 1 as seen in a normal direction of the surface of an anode 10.
Figure 3:
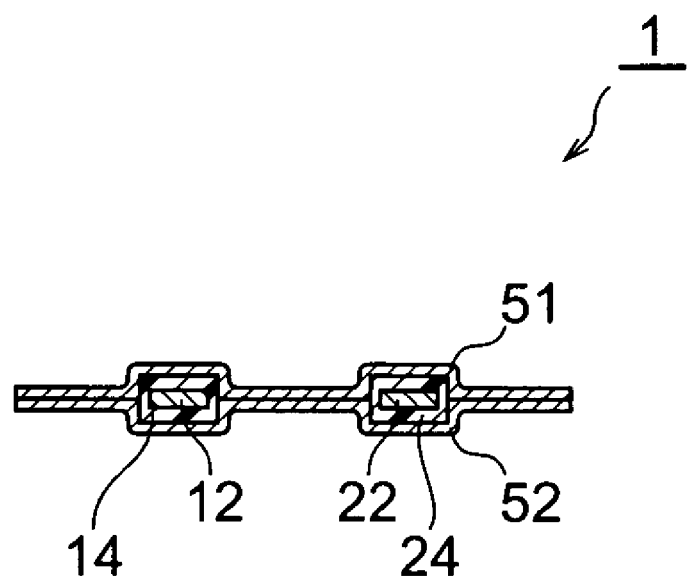
FIG. 3 is a schematic sectional view of the electrochemical capacitor (electric double layer capacitor) taken along the line X1—X1 of FIG. 1.
Figure 4:
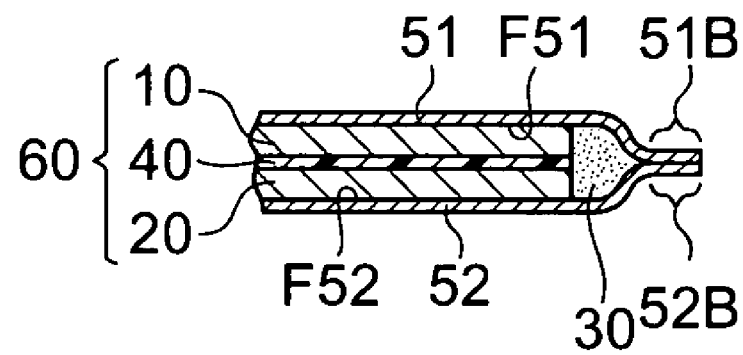
FIG. 4 is a schematic sectional view showing a major part of the electrochemical capacitor (electric double layer capacitor) taken along the line X2—X2 of FIG. 1.
Figure 5:
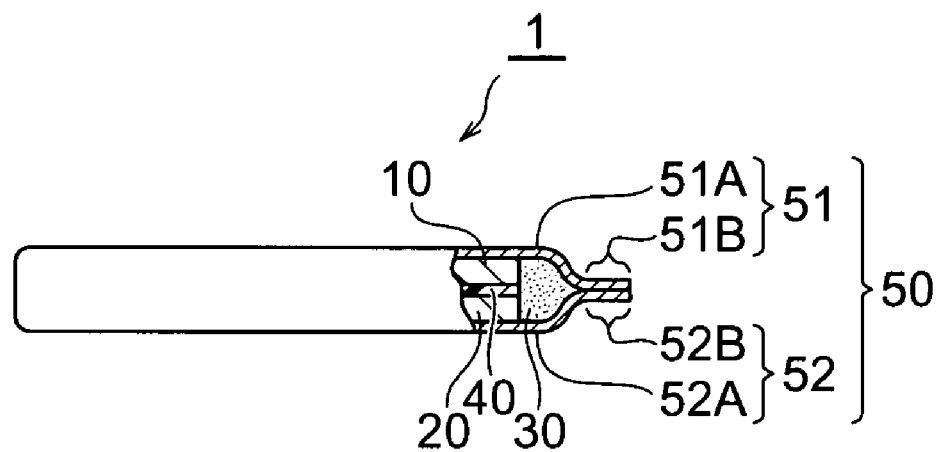
FIG. 5 is a schematic sectional view showing a major part of the electrochemical capacitor (electric double layer capacitor) taken along the line Y—Y of FIG. 1.

FIG. 1 is a front view showing an example of an electrochemical capacitor (electric double layer capacitor) made by a preferred embodiment of the manufacturing method of the present invention. FIG. 2 is a developed view of the inside of the electrochemical capacitor 1 shown in FIG. 1 as seen in a normal direction of the surface of an anode 10. FIG. 3 is a schematic sectional view of the electrochemical capacitor 1 taken along the line X1—X1 of FIG. 1. FIG. 4 is a schematic sectional view showing a major part of the electrochemical capacitor 1 taken along the line X2—X2 of FIG. 1. FIG. 5 is a partly sectional side view of the electrochemical capacitor shown in FIG. 1, whereas the partial cross section shown in FIG. 5 represents the major part taken along the line Y—Y of FIG. 1. As shown in FIGS. 1 to 5, the electrochemical capacitor 1 is mainly constituted by a planar anode 10 (first electrode) and a planar cathode 20 (second electrode) which oppose each other, a planar separator 40 disposed between the anode 10 and cathode 20 so as to be adjacent thereto, a nonaqueous electrolytic solution 30, a case 50 accommodating them in a closed state, an anode lead 12 (first lead) having one end part electrically connected to the anode 10 and the other end part projecting out of the case 50, and a cathode lead 22 (second lead) having one end part electrically connected to the cathode 20 and the other end part projecting out of the case 50. Here, for convenience of explanation, "anode" 10 and "cathode" 20 are determined with reference to polarities of the electrochemical capacitor 1 at the time of discharging.

The electrochemical capacitor 1 has the configuration explained in the following. Details of the individual constituents in this embodiment will now be explained with reference to FIGS. 1 to 9.

The case 50 includes a first film 51 and a second film 52 which oppose each other. Here, as shown in FIG. 2, the first film 51 and second film 52 are connected to each other in the electrochemical capacitor 1. Namely, the case 50 is formed by folding a rectangular film made of a single composite package film at a fold line X3—X3 shown in FIG. 2, so that a set of opposing edge parts of the rectangular film (an edge part 51B of the first film 51 and an edge part 52B of the second film 52) overlie each other, and heat-sealing (thermally fusing) them in a heat-sealing step which will be explained later. In FIG. 1, 51A refers to the first film main part. The first film 51 is constituted by the first film main part 51A and the edge part 51B. In FIG. 2, 52A refers to the second film main part. The second film 52 is constituted by the second film main part 52A and the edge part 52B.

The first film 51 and second film 52 refer to respective parts of the films having faces (F51 and F52) opposing each other formed when the single rectangular film is folded as mentioned above. Here, a part obtained by heat-sealing and bonding the respective edge parts of the first film 51 and second film 52 to each other will be referred to as "seal part".

This makes it unnecessary to provide edge parts for bonding the first film 51 and second film 52 to each other at the part of the fold line X3—X3. Therefore, seal parts in the case 50 can be saved. As a result, the volume energy density with reference to the volume of the space where the electrochemical capacitor 1 is to be placed can be made higher.

As shown in FIGS. 1 and 2, this embodiment is arranged such that one end each of the anode lead 12 connected to the anode 10 and the cathode lead 22 projects out of the seal part where the edge part 51B of the first film 51 and the edge part 52B of the second film 52 are connected each other. The anode lead 12 and cathode lead 22 are heat-sealed (thermally fused) to the edge part 51B of the first film 51 and the edge part 52B of the second film 52 by using a member such as die (not depicted), for example, so as to construct a seal part. As a consequence, the case 50 secures a sufficient sealing effect.

The film constituting the first film 51 and second film 52 is a flexible film. The film has a light weight and is easy to attain a smaller thickness, whereby the electrochemical capacitor 1 itself can be formed like a thin film. This can easily improve the inherent volume energy density, and the volume energy density with reference to the volume of the space where the electrochemical capacitor 1 is to be placed.

The film is not restricted in particular as long as it is a flexible film. From the viewpoint of securing a sufficient mechanical strength and a light weight in the case 50 while effectively preventing moisture and air from invading the case 50 from the outside and electrolyte components from dissipating from the inside to the outside, it will be preferred if the film is a "composite package film" comprising at least an innermost layer made of a synthetic resin in contact with the nonaqueous electrolytic solution and a metal layer disposed on the upper side of the innermost layer.

Figure 6:
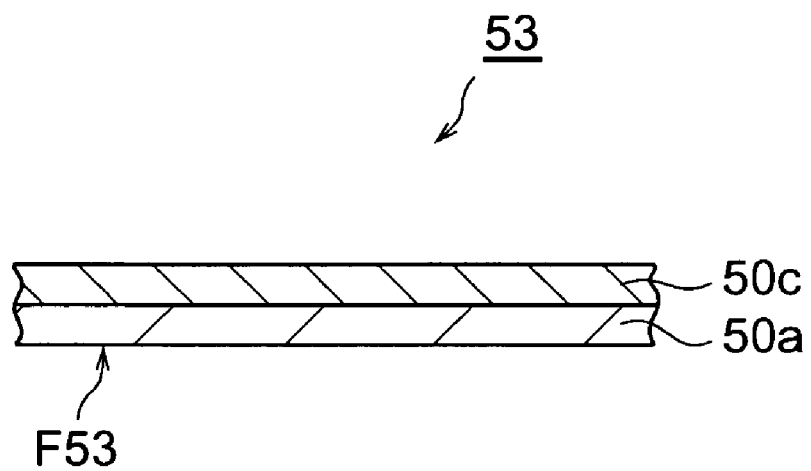
FIG. 6 is a schematic sectional view showing an example of a basic configuration of a film which becomes a constituent material of a case of the electrochemical capacitor (electric double layer capacitor) shown in FIG. 1.
Figure 7:
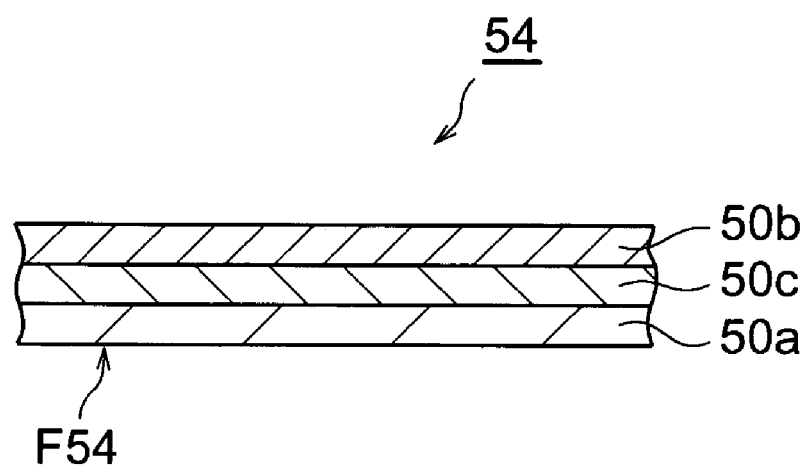
FIG. 7 is a schematic sectional view showing another example of the basic configuration of the film which becomes a constituent material of the case of the electrochemical capacitor (electric double layer capacitor) shown in FIG. 1.

Examples of the composite package film usable as the first film 51 and second film 52 include those configured as shown in FIGS. 6 and 7.

The composite package film 53 shown in FIG. 6 comprises an innermost layer 50a made of a synthetic resin in contact with a nonaqueous electrolytic solution at its inner face F53, and a metal layer 50c disposed on the other face (outer face) of the innermost layer 50a. The composite package film 54 shown in FIG. 7 has a configuration in which an outermost layer 50b made of a synthetic resin is further disposed on the outer face of the metal layer 50c of the composite package film 53 shown in FIG. 6. Namely, in the composite package film 54, the metal layer 50c and the outermost layer 50b are successively laminated on the innermost layer 50a. In FIG. 7, F54 refers to the inner face of the composite package film.

The composite package film usable as the first film 51 and second film 52 is not restricted in particular as long as it is a composite package material having at least two layers comprising at least one synthetic resin layer such as the innermost layer 50a and the metal layer 50c such as metal foil. From the viewpoint of more reliably attaining the effect mentioned above, however, it will be preferred if the film is constituted by at least three layers including the innermost layer 50a, the outermost layer 50b made of a synthetic resin disposed on the outer surface side of the case 50 farthest from the innermost layer 50a, and at least one metal layer 50c disposed between the innermost layer 50a and the outermost layer 50b as with the composite package film 54 shown in FIG. 7.

The innermost layer 50a is a flexible layer. The material constituting this layer is not restricted in particular as long as it is a synthetic resin which can exhibit the flexibility and has a chemical stability (a characteristic free from chemical reactions, dissolving, and swelling) with respect to the nonaqueous electrolytic solution employed and a chemical stability with respect to oxygen and water (moisture in the air). Preferably, the material further has such a characteristic that it exhibits a low permeability to oxygen, water (moisture in the air), and components of the nonaqueous electrolytic solution. Examples of such a material include thermoplastic resins such as polyethylene, polypropylene, acid-denatured polyethylene, acid-denatured polypropylene, polyethylene ionomer, and polypropylene ionomer.

When a layer made of a synthetic resin such as the outermost layer 50b is further provided in addition to the innermost layer 50a as in the composite package film 54 shown in FIG. 7 mentioned above, the synthetic resin layer may use the same constituent material as with the innermost layer. For example, a layer made of engineering plastics such as polyethylene terephthalate (PET) and polyamide (nylon) may be used as the synthetic resin layer.

Preferably, all the seal parts in the case 50 are sealed by heat-sealing (thermal fusion) from the viewpoint of productivity. In the electrochemical capacitor 1, in particular, the seal parts where the anode lead 12 and cathode lead 22 project out of the case 50 are sealed by heat-sealing (thermal fusion).

Preferably, the metal layer 50c is a layer formed from a metal material exhibiting a corrosion resistance to oxygen, water (moisture in the air), and the nonaqueous electrolytic solution. As such a metal layer 50c, metal foils made of aluminum, aluminum alloys, titanium, nickel, etc. may be used, for example.

Figure 8:
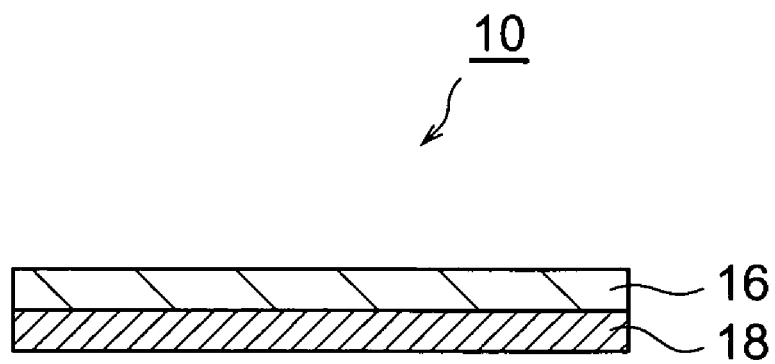
FIG. 8 is a schematic sectional view showing an example of a basic configuration of the anode of the electrochemical capacitor (electric double layer capacitor) shown in FIG. 1.
Figure 9:
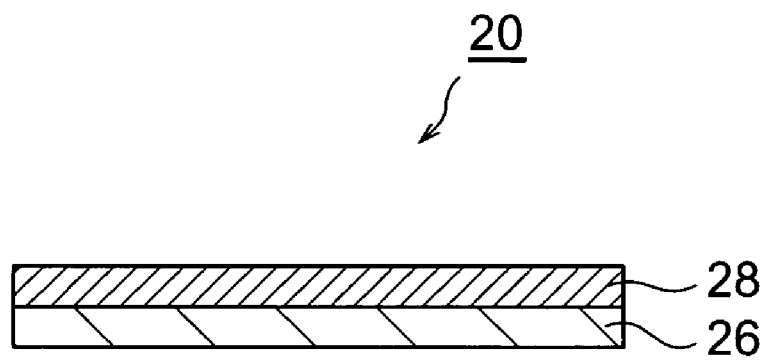
FIG. 9 is a schematic sectional view showing an example of a basic configuration of a cathode of the electrochemical capacitor (electric double layer capacitor) shown in FIG. 1.

The anode 10 and cathode 20 will now be explained. FIG. 8 is a schematic sectional view showing an example of the basic configuration of the anode 10 in the electrochemical capacitor 1 shown in FIG. 1. FIG. 9 is a schematic sectional view showing an example of the basic configuration of the cathode 20 in the electrochemical capacitor 1 shown in FIG. 1. Each of the anode 10 and cathode 20 is formed by a preferred embodiment of the method of making an electrochemical capacitor in accordance with the present invention.

As shown in FIG. 8, the anode 10 comprises a collector layer 16 constituted by an electronically current collector and a porous layer 18 constituted by an electronically conductive porous body formed on the collector layer 16. As shown in FIG. 9, the cathode 20 comprises a collector layer 26 and a porous layer 28 constituted by an electronically conductive porous body formed on the collector layer 26.

The collector layers 16 and 26 are not restricted in particular as long as they are conductors which can sufficiently transfer electric charges to the porous layers 18 and 28, respectively, whereby collectors employed in known electric double layer capacitors can be used. For example, metal foils such as aluminum, etc. can be used for the collector layers 16 and 26.

The porous particle made of an electronically conductive material as a constituent material of the porous layers 18 and 28 is not limited in particular as long as it is a particle made of an electronically conductive porous carbon material subjected to plasma processing, which will be explained later, after activation. Particles employed in porous layers constituting polarizable electrodes such as carbon electrodes used in known electric double layer capacitors can be used. For example, those having a constituent material mainly composed of a particle made of a carbon material obtained by activating coking coal (e.g., carbonized petroleum coke or phenol resin made by a delayed coker using bottom oils from fluidized catalytic crackers of petroleum heavy oils or residual oils of vacuum distillators as a material oil, natural coconut shells, etc.) can be used.

The porous layers 18 and 28 contain a binder as well. Preferred as such a binder is a synthetic resin which does not dissolve in an organic solvent used in a coating liquid preparing step which will be explained later. This can more reliably prevent the porous particle surface from being covered in excess by binder particles so that the surface cannot be utilized effectively. More preferred as the binder is a synthetic resin which is soluble in a ketone type solvent while having the characteristic mentioned above. Examples of such a ketone type solvent include acetone, methylethyl ketone, methylisobutyl ketone, diisobutyl ketone, and cyclohexane.

Specifically, preferred examples of the binder include polytetrafluoroethylene (hereinafter referred to as "PTFE"), polyvinylidene fluoride (hereinafter referred to as "PVDF"), polyethylene (hereinafter referred to as "PE"), polypropylene (hereinafter referred to as "PP"), and fluorine type resins. In particular, more preferable from the viewpoint of more reliably preventing the porous particle surface from being covered in excess by binder particles so that the surface cannot be utilized effectively is a fluorine type resin which does not dissolve in an organic solvent used in the coating liquid preparing step, which will be explained later, while being soluble in a ketone type solvent.

Examples of such a fluorine type resin include a copolymer having repeating units respectively based on vinylidene fluoride (VDF) and tetrafluoroethylene (TFE), a copolymer having repeating units respectively based on VDF and hexafluoropropylene (HFP), and a copolymer having repeating units respectively based on VDF, TFE, and HFP.

The porous layers 18 and 28 may be doped with a conductive auxiliary agent (carbon black or the like) for imparting a conductivity to carbon powder, for example.

The separator disposed between the anode 10 and cathode 20 is not restricted in particular as long as it is formed from an ion-permeable, insulating porous body, whereby separators employed in known electrochemical capacitors such as electric double layer capacitors can be used. Examples of the insulating porous body include laminates of films made of polyethylene, polypropylene, and polyolefin, extended films of mixtures of the resins mentioned above, and fibrous nonwoven made of at least one species of constituent materials selected from the group consisting of cellulose, polyester, and polypropylene.

The collector 28 of the cathode 20 is electrically connected to one end of the cathode lead 22 made of aluminum, for example, whereas the other end of the cathode lead 22 extends to the outside of the case 50. On the other hand, the collector 18 of the anode 10 is electrically connected to one end of the anode lead conductor 12 made of copper or nickel, for example, whereas the other end of the anode lead 12 extends to the outside of the case 14.

The inner space of the case 50 is filled with the nonaqueous electrolytic solution 30, which is partly contained within the anode 10, cathode 20, and separator 40.

The nonaqueous electrolytic solution 30 is not restricted in particular, whereby nonaqueous electrolytic solutions (nonaqueous electrolytic solutions using organic solvents) employed in known electrochemical capacitors such as electric double layer capacitors can be used.

Though not restricted in particular, the species of the nonaqueous electrolytic solution 30 is selected in view of the solubility and degree of dissociation of the solute and the viscosity of the liquid. Desirably, it is a nonaqueous electrolytic solution having a high conductivity and a high potential window (high decomposition starting voltage). Examples of the organic solvent include propylene carbonate, diethylene carbonate, and acetonitrile. An example of the electrolyte is a quaternary ammonium salt such as tetraethylammonium tetrafluoroborate (tetraethylammonium boron tetrafluoride). In this case, it is necessary that the mingling moisture be controlled strictly.

Further, as shown in FIGS. 1 and 2, the part of the anode lead 12 in contact with the seal part of the case 50 constituted by the edge part 51B of the first film 51 and the edge part 52B of the second film 52 is covered with an adhesive layer 14 made of an adhesive (insulator) for sufficiently securing the adhesion between the anode lead 12 and the films and preventing the anode lead 12 from coming into electric contact with the metal layer 50c in the composite package film constituting the individual films. The part of the cathode lead 22 in contact with the seal part of the case 50 constituted by the edge part 51B of the first film 51 and the edge part 52B of the second film 52 is covered with an adhesive layer 24 made of an adhesive (insulator) for sufficiently securing the adhesion between the cathode lead 22 and the films and preventing the cathode lead 22 from coming into electric contact with the metal layer 50c in the composite package film constituting the individual films.

The adhesive to become a constituent material of the adhesive layers 14 and 24 is not restricted in particular as long as it is an adhesive containing a synthetic resin which can closely adhere to both metal and synthetic resin. From the viewpoint of securing a sufficient adhesion, it will be preferred if the adhesive is an adhesive containing at least one species of resins selected from the group consisting of denatured polypropylene, denatured polyethylene, and epoxy resin. The adhesive layers 14 and 24 can be omitted if each of the anode lead 12 and cathode lead 22 can sufficiently be prevented from coming into contact with the metal layer in the composite package film while securing the adhesion to the composite package film.

A method (preferred embodiment of the manufacturing method of the present invention) of making the case 50 and electrochemical capacitor 1 (electric double layer capacitor) will now be explained.

First, an example of a method of making a matrix 60 (a laminate in which the anode 10, separator 40, and cathode 20 are successively laminated in this order) will be explained. In the following, a method of making electrodes to become the anode 10 and cathode 20 will be explained.

Figure 10:
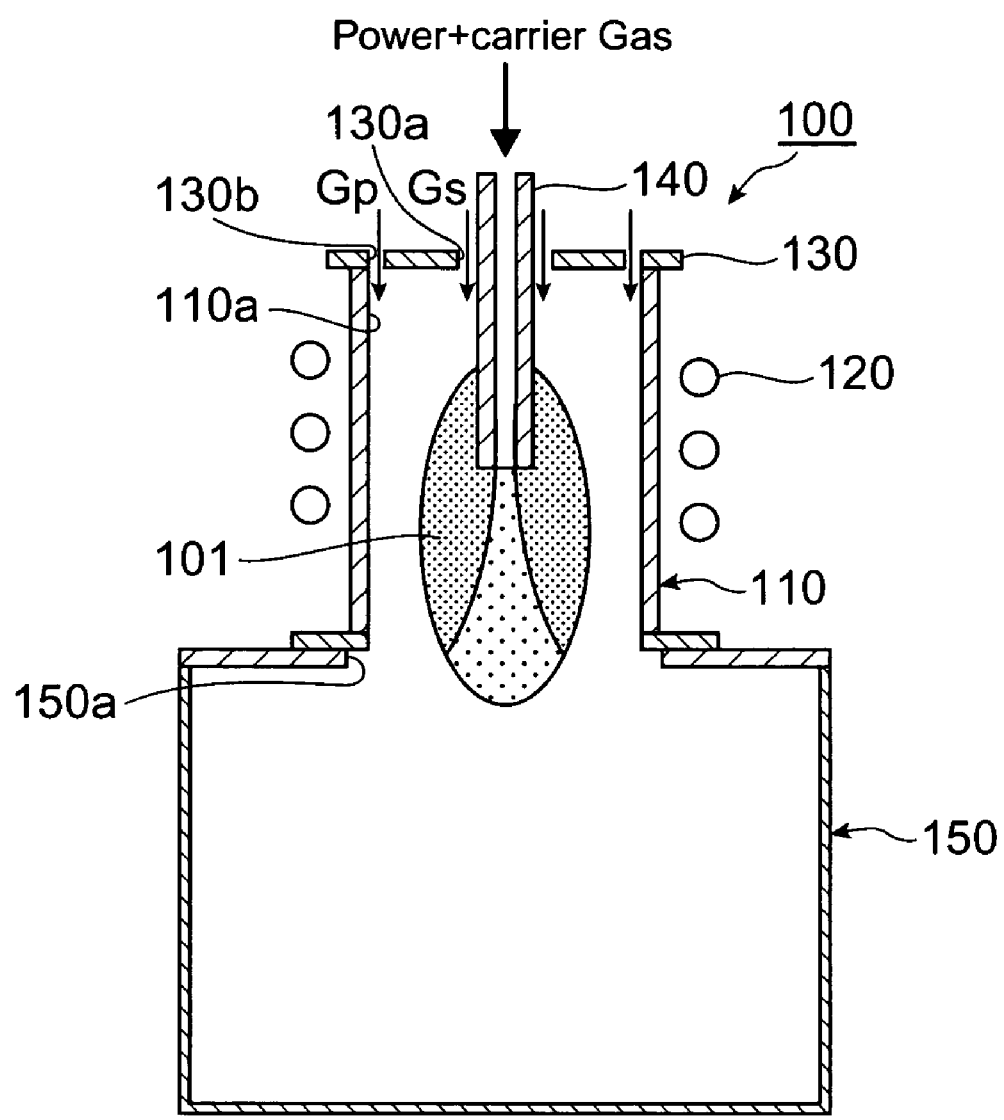
FIG. 10 is a schematic diagram of a high-frequency thermal plasma generator (plasma torch) employed for carrying out plasma processing.

First, in the plasma processing step, a high-frequency thermal plasma generator (plasma torch) shown in FIG. 10 is used so that particles (hereinafter referred to as "porous particles P1") made of a carbon material to become a constituent material of the porous layer 18 of the anode 10 and the porous layer 28 of the cathode 20 are obtained from a material activated by a known activating technique. Specifically, in a plasma gas atmosphere, the material is subjected to the high-frequency thermal plasma processing, so as to form the porous particles P1. FIG. 10 is a schematic diagram showing the high-frequency thermal plasma generator (plasma torch) used for plasma processing.

Examples of the material include carbon materials and materials which become carbon materials upon thermal plasma processing.

Examples of the materials which become carbon materials upon thermal plasma processing include phenol resin, acrylic resins, furan type resins, linear vinyl type polymers such as polyvinylidene chloride (PVDC) and polyacrylonitrile, and polymers constituted by biphenyl bonds such as polyphenylene. Nitrogen-containing resins, e.g., polyamides such as polyaniline, polyimide, and nylon, nitrogen-containing phenol resin, and the like can also be used as the materials to become carbon materials upon thermal plasma processing. Also, various saccharides such as polysaccharides can be used. Among them, phenol resin, truly spherical phenol resin in particular, is preferred.

Examples of the material made of the carbon material include graphite, glassy carbon, pyrolytic graphite, carbon fiber, carbon paste, and activated carbon, among which activated carbon is preferred. Activated carbon is not restricted in particular, but is preferably one mainly composed of activated coking coal. Examples of coking coal include carbonized petroleum coke or resin (phenol resin) made by a delayed coker using bottom oils from fluidized catalytic crackers of petroleum heavy oils or residual oils of vacuum distillators as a material oil, and a carbonized natural material (e.g., coconut shell carbon).

Among them, MCMB (mesophase carbon microbeads) are preferred. MCMB are obtained by graphitizing truly spherical carbonaceous materials obtained from pitch, and can be handled more easily than conventional graphite materials in the making of electrode materials. Namely, MCMB have excellent fluidity, so that they are suitable for high-frequency thermal plasma processing and can be processed in a large amount, thus tending to be excellent in productivity. Also, MCMB tend to be easier to yield a film when forming electrodes.

The material to be subjected to high-frequency thermal plasma processing and the carbonaceous material after the high-frequency thermal plasma processing are preferably in the form of particle or powder, whereas their average particle size is preferably about 0.5 to 100 μm. Though these particles are preferably spherical, they may have forms other than spherical forms, e.g., spheroid or amorphous forms.

The high-frequency thermal plasma processing can be carried out, for example, in conformity to Takamasa Ishigaki, Ceramics, 30 (1995), No. 11, 1013–1016, and Japanese Patent Application Laid-Open Nos. HEI 7-31873, HEI 10-92432, and 2000-223121.

The high-frequency thermal plasma generator (thermal plasma torch) 100 shown in FIG. 10 is one in which an object is continuously introduced into the plasma torch 101 and collected from the lower part. The high-frequency thermal plasma generator includes a container 150 having an opening 150a, to which a water-cooled double pipe is connected. A high-frequency coil 12 is wound about the outer periphery of the water-cooled double pipe 110. A high-frequency current is caused to flow through the high-frequency coil 12, so as effect high-frequency electromagnetic induction, thereby forming thermal plasmas within the inner space of the water-cooled double pipe 110. A lid 130 is attached to an opening part 110a located in the upper part of the water-cooled double pipe 110, whereas a powder-supplying water-cooled probe 140 for supplying powders of the material to be subjected to the high-frequency thermal plasma processing and a carrier gas is placed in the lid 130. A central gas (Gp) for mainly forming a plasma flow and a sheath gas (Gs) for mainly surrounding the outside of the plasma flow are introduced into the apparatus 100. Here, Gs and Gp are introduced through openings 130a and 130b formed in the lid 130, respectively.

In the present invention, the central gas, sheath gas, and carrier gas are collectively referred to as "plasma gas". The high-frequency thermal plasma processing is carried out in this plasma gas atmosphere.

As the plasma gas, at least Ar is preferably used. More preferably, at least one species of $N_2$, $H_2$, $CO_2$, and CO is used together with Ar. In particular, $N_2$ or $H_2$ is used together with Ar, or $CO_2$ is further added thereto. The content of gases other than Ar in the plasma gas is preferably 1 to 20 vol % with respect to the total amount of the plasma gas. Though species of gases employed in the central gas, sheath gas, and carrier gas are not restricted in particular, each preferably contains at least Ar. In particular, it will be preferred if a diatomic gas such as $N_2$ or $H_2$ is mixed into the sheath gas in order to protect the inner wall of the torch.

When at least $H_2$ is used as the plasma gas, the irreversible capacity is reduced, so that the initial charging/discharging efficiency tends to improve more sufficiently. The total flow rate of the central gas and sheath gas is usually 2 to 200 L/min, preferably 30 to 130 L/min.

The amount of the material introduced is preferably 1 to 500 g/min, whereas the flow rate of the carrier gas is preferably 1 to 100 L/min.

When the plasma gas is appropriately selected, the effect caused by the high-frequency thermal plasma can be regulated. For example, since $H_2$ has a thermal conductivity higher than that of $N_2$, heating efficiency usually tends to become higher when $H_2$ is used.

The high-frequency thermal plasma generating condition is such that the frequency is usually 0.5 to 6 MHz, preferably 3 to 6 MHz, the input power is 3 to 60 kW, and the pressure within the torch is 1 to 100 kPa, preferably 10 to 70 kPa.

Using such an apparatus 100 enables high-frequency thermal plasma processing at a temperature of 3,000° to 15,000° C. In the present invention, the material retention time in the temperature region of 3,000° to 15,000° C. is preferably 0.001 to 10 seconds, about 0.02 to 0.5 second in particular.

The size of the high-frequency thermal plasma generator 100 (plasma torch) is not restricted in particular. In the structure shown in FIG. 10, the diameter of the water-cooled double pipe is preferably 10 to 1,000 mm, more preferably 50 to 100 mm, whereas its height is preferably 50 to 3,000 mm, more preferably 200 to 3,000 mm.

The material may be subjected to the high-frequency thermal plasma processing either by itself or in a state where an oxide is mixed therewith. Preferred examples of the oxide used in this case include lithium cobaltate ($LiCoO_2$), lithium nickelate ($LiNiO_2$), lithium manganate ($LiMnO_2$), lithium manganese spinel ($LiMn_2O_4$), lithium vanadium compounds, $V_2O_5$, and olivine type $LiMPO_4$ (where M is Co, Ni, Mn, or Fe). The amount of the oxide compounded is preferably 10% by mass or less of the total amount of the mixture (material+oxide).

The BET specific surface area of thus obtained porous particle determined from nitrogen adsorption isotherms by using a BET adsorption isotherm is preferably 1,000 $m^2/g$, more preferably 1,500 to 3,000 $m^2/g$. A carbon material for an electrode having such a BET specific surface area can attain a sufficient electrode characteristic more reliably when used as a constituent material of an electrochemical capacitor electrode.

Next, the anode 10 and cathode 20 are formed. In the present invention, the anode 10 and cathode 20 can be formed by any of wet and dry methods which will be explained later. In any method, operations are caused to proceed in an inert gas atmosphere. For example, operations are carried out in a glove box, filled with an inert gas, having the oxygen concentration adjusted to 1 ppm or less, and the relative humidity adjusted to 0.04% (a dew point of about −60° C.) or less.

Wet Method

A case where the anode 10 and cathode 20 are formed by a wet method will now be explained. First, in a coating liquid preparing step, an electrode forming coating liquid L2 is prepared. FIGS. 11(a) and 11(b) are explanatory views for explaining the coating liquid preparing step of preparing the electrode forming coating liquid.

First, as shown in FIG. 11(a), porous particles P1 are put into a container Cl containing an organic solvent L1 usable for a nonaqueous electrolytic solution and a stirrer SB1, and the resulting mixture is stirred. Examples of the organic solvent used here include propylene carbonate, ethylene carbonate, γ-butyrolactone, acetonitrile, and dimethyl formamide.

Subsequently, a particle P2 made of a conductive auxiliary agent (carbon black, powder graphite, or the like mentioned above), a particle P3 made of a binder (PTFE, PVDF, PE, PP, fluorine rubber, or the like mentioned above), and a liquid S which can dissolve or disperse the particle made of the binder and disperse the porous particle P4 and particle P2 (preferably dissolves the particle P3 made of the binder) are put into the organic solvent L1 containing the porous particles P1, and the resulting mixture is stirred, so as to prepare the electrode forming coating liquid L2.

Figure 12:
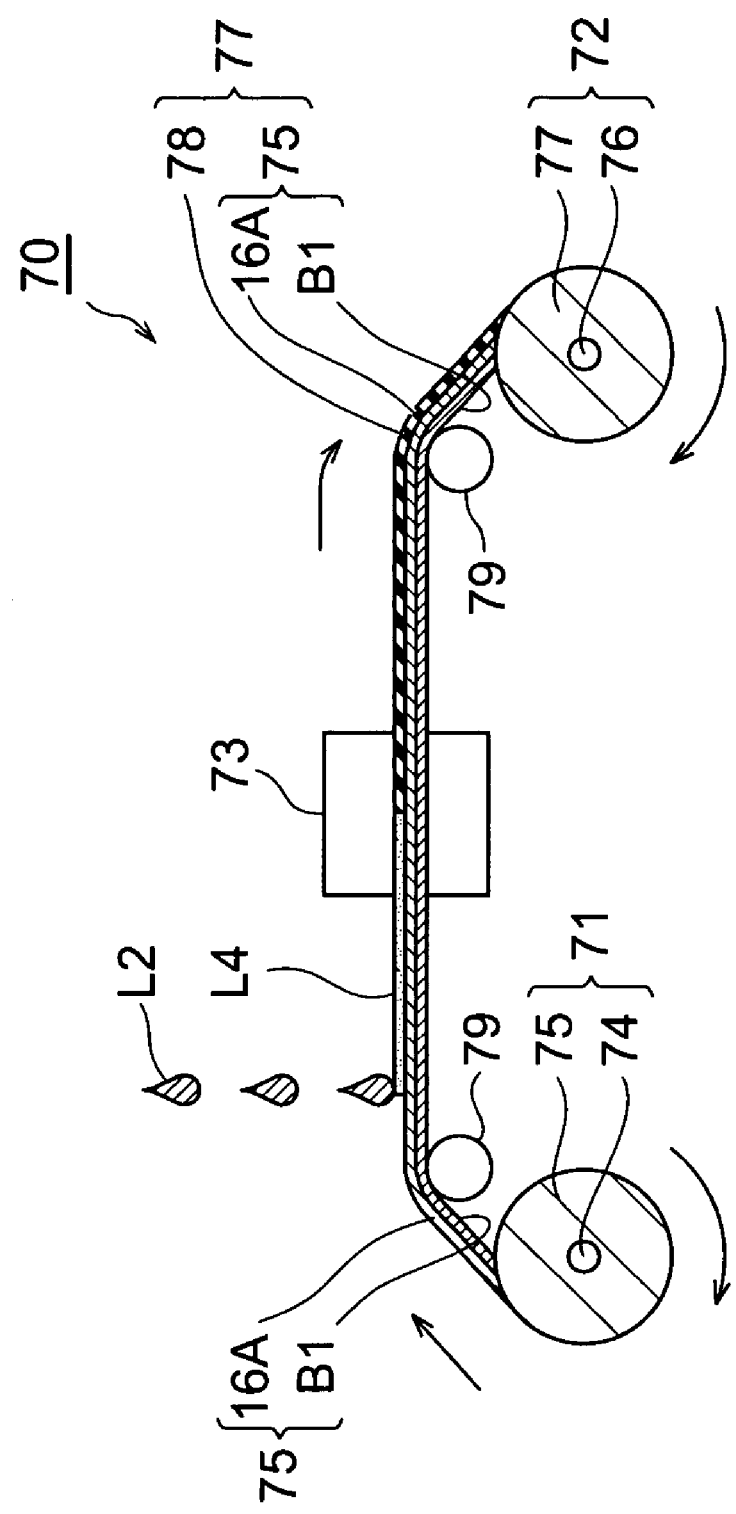
FIG. 12 is an explanatory view for explaining a step of forming an electrode sheet using the electrode forming coating liquid.
Figure 13:
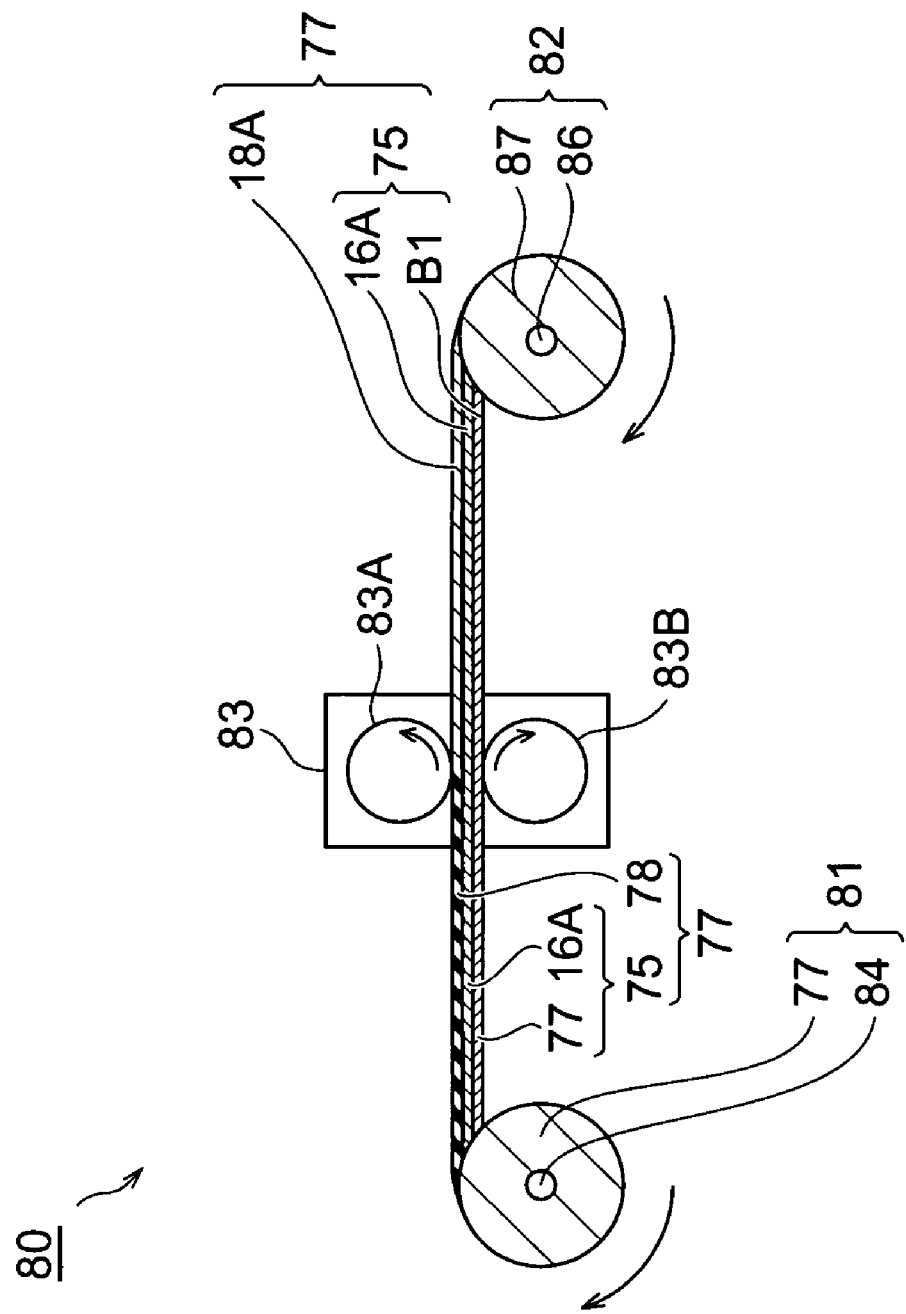
FIG. 13 is an explanatory view for explaining the step of forming an electrode sheet using the electrode forming coating liquid.
Figure 14:
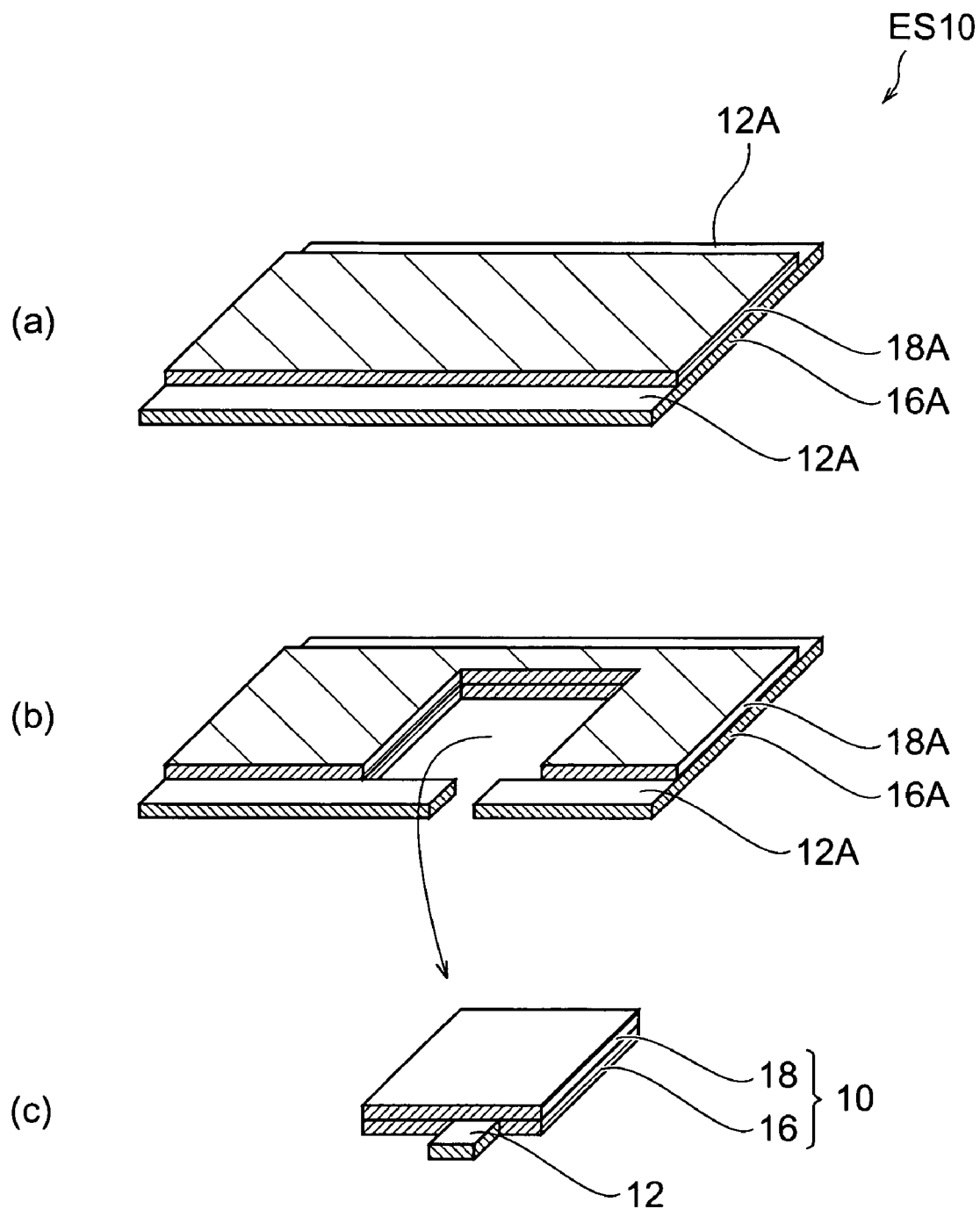
FIG. 14 is an explanatory view for explaining a step of forming an electrode from the electrode sheet.

Next, using the electrode forming coating liquid L2 and apparatus 70 and 80 shown in FIGS. 12 and 13, an electrode sheet ES10 shown in FIG. 14 is formed. The following explains methods of forming the electrode sheet ES10 (see FIG. 14) for the anode 10 and the anode 10 obtained from the electrode sheet ES10, while omitting the method of forming the cathode 20 having the same configuration as with the anode 10.

The apparatus 70 shown in FIG. 12 is mainly constituted by a first roll 71, a second roll 72, a dryer 73 disposed between the first roll 71 and second roll 72, and two support rolls 79 disposed on both sides of the dryer 73 between the first roll 71 and second roll 72. The first roll 71 is constituted by a cylindrical core 74 and a tape-like laminate sheet 75. The laminate sheet 75 has one end connected to the core 74 and is wound about the core 74. The laminate sheet 75 is configured such that a metal foil sheet 16A is laminated on a support sheet B1.

The second roll 72 has a cylindrical core 76 to which the other end of the laminate sheet 75 is connected. A core-driving motor (not depicted) for rotating the core 76 of the second roll 72 is connected to the core 76, whereby a laminate sheet 77 obtained by applying the electrode forming coating liquid L2 and then drying it in the dryer 73 is wound at a predetermined speed.

First, when the core-driving motor revolves in the apparatus 70, the core 76 of the second roll 72 is rotated, whereby the laminate sheet 75 wound about the core 74 of the first roll 71 is drawn out of the first roll 71. Subsequently, the electrode forming coating liquid L2 is applied onto the metal foil sheet 16A of the drawn laminate sheet 75 (a coating step) This forms a coating film L4 made of the electrode film forming coating liquid L2 on the metal foil sheet 16A.

Then, as the core-driving motor revolves, the part of the laminate sheet 75 formed with the coating film L4 is guided into the dryer 73 by the support rolls 79 and is dried. In the dryer 73, the coating film L4 on the laminate sheet 75 is dried, whereby the organic solvent L1 and the liquid S (liquid) are eliminated from the coating film L4. Thus, the coating film L4 becomes a layer 78 (hereinafter referred to as "precursor layer 78") which is a precursor of the porous layer 18 when forming an electrode (a liquid eliminating step). Then, as the core-driving motor revolves, the laminate sheet 77 in which the precursor layer 78 is formed on the laminate sheet 75 is guided to the core 76 by the support rolls 79 and wound about the core 76.

Next, using the laminate sheet 77 and the apparatus 80 shown in FIG. 13, the electrode sheet ES10 is produced.

The apparatus 80 shown in FIG. 13 is mainly constituted by a first roll 81, a second roll 82, and a roll press 83 disposed between the first roll 81 and second roll 82. The first roll 81 is constituted by a cylindrical core 84 and the tape-like laminate sheet 77 mentioned above. The laminate sheet 77 has one end connected to the core 84, and is wound about the core 84. The laminate sheet 77 is configured such that the precursor layer 78 is further laminated on the laminate sheet 75 in which the metal foil sheet 16A is laminated on the support sheet B1.

The second roll 82 has a cylindrical core 86 to which the other end of the laminate sheet 77 is connected. A core-driving motor (not depicted) for rotating the core of the second roll 82 is connected to the core 86, whereby a laminate sheet 87 obtained by pressing in the roll press 83 is wound at a predetermined speed.

First, when the core-driving motor revolves in the apparatus 80, the core 86 of the second roll 82 is rotated, whereby the laminate sheet 77 wound about the core 84 of the first roll 81 is drawn out of the first roll 81. Subsequently, as the core-driving motor revolves, the laminate sheet 77 is guided into the roll press 83. In the roll press 83, two cylindrical rollers 83A and 83B are disposed. The rollers 83A and 83B are arranged such that the laminate sheet 77 is inserted therebetween. When the laminate sheet 77 is inserted between them, the side face of the roller 83A and the outer surface of the precursor layer 78 of the laminate sheet 77 come into contact with each other, the side face of the roller 83B and the outer surface (rear face) of the support sheet B1 of the laminate sheet 77 come into contact with each other, and the laminate sheet 77 can be pressed at a predetermined temperature under a predetermined pressure.

The cylindrical rollers 83A and 83B are provided with respective rotating mechanisms (not depicted) rotating in the direction conforming to the moving direction of the laminate sheet 77. In each of the cylindrical rollers 83A and 83B, the distance between bottom faces is not smaller than the width of the laminate sheet 77.

In the roll press 83, the precursor layer 78 on the laminate sheet 77 is heated and pressed when necessary, so as to become a porous layer 18A (the porous layer 18 when forming an anode). Then, as the core-driving motor revolves, the laminate sheet 87 in which the porous layer 18A is formed on the laminate sheet 77 is wound about the core 86.

Next, the laminate sheet 87 wound about the core 86 is cut into a predetermined size, so as to yield the electrode sheet ES10 as shown in FIG. 14(a). In the electrode sheet ES10 shown in FIG. 14(a), an edge part 12A exposing the surface of the metal foil sheet 16A is formed. The edge part 12A can be formed by applying the electrode forming coating liquid L2 onto the metal foil sheet 16A of the laminate sheet 75 while regulating such that only the center part of the metal foil sheet 16A is coated with the electrode forming coating liquid L2.

Subsequently, as shown in FIG. 14(b), the electrode sheet ES10 is punched out in conformity to the scale of the electrochemical capacitor to be produced, so as to yield the anode 10 shown in FIG. 14(c). When the electrode sheet ES10 is punched out such that the above-mentioned edge part 12 is included as an anode lead 12, the anode 10 integrated beforehand with the anode lead 12 can be obtained. Here, the metal foil sheet 16A becomes the collector layer 16 in the anode 10, whereas the porous layer 18A becomes the porous layer 18 in the anode (a porous layer forming step). In the case where the anode lead 12 and cathode lead 22 have not been connected yet, they are prepared separately and electrically connected to the anode 10 and cathode 20, respectively.

Next, a separator 40 prepared separately is disposed between the anode 10 and cathode 20 while in contact with them, whereby a matrix 60 is completed.

In the electrochemical capacitor 1, the separator 40 disposed between the anode 10 and cathode 20 is arranged such that one face of the separator 40 is in contact with the face (hereinafter referred to as "inner face") of the anode 10 on the cathode 20 side, and the other face is in contact with the face (hereinafter referred to as "inner face") of the cathode 20 on the anode 10 side. Namely, while the separator 40 is disposed in contact with the anode 10 and cathode 20, they are not joined together by thermocompression bonding or the like.

When the separator 40 is joined to the anode 10 and cathode 20 by thermocompression bonding or the like, 1) fine pores or voids contributing to forming an electric double layer in both electrodes are collapsed; and 2) fine pores in the separator 40 are partly collapsed, whereby internal resistance becomes greater. When the electrochemical capacitor is used as a small-size electrochemical capacitor having a small capacitor capacity mounted in a small-size electronic device in particular, a small difference in the internal resistance (impedance) remarkably affects the discharge characteristic. As the internal resistance becomes greater, ohmic loss (IR loss) increases, whereby the discharge characteristic deteriorates. When a large current is discharged in particular, the ohmic loss becomes so large that discharging may become impossible. Therefore, this electrochemical capacitor 1 (electric double layer capacitor) employs a configuration in which the separator 40 is arranged in contact with the anode 10 and cathode 20 as mentioned above.

Also, when the configuration in which the separator 40 is arranged in contact with the anode 10 and cathode 20 as mentioned above is employed, it is necessary that the contact state between the separator 40 and anode 10 and the contact state between the separator 40 and cathode 20 be adjusted such that their respective gaps attain minimal values. When the contact state between the separator 40 and anode 10 and the contact state between the separator 40 and cathode 20 are insufficient, the internal resistance of the electrochemical capacitor 1 (electric double layer capacitor) increases, so that the discharging characteristic deteriorates.

Dry Method

In the present invention, the anode 10 and cathode 20 may be produced by a dry method without preparing the above-mentioned electrode forming coating liquid.

The dry method is a method which forms an electrode without using a solvent, and is advantageous in that 1) it is safe since no solvent is necessary; 2) the electrode (porous layer) can easily attain a higher density, since particles are extended alone without using the solvent; 3) the aggregation and uneven distribution of porous particles P1, particles P2 made of a conductive auxiliary agent for providing a conductivity, and particles P3 made of a binder occurring in the process of drying a liquid film made of an electrode forming coating liquid applied onto the collector, which have been a problem in the wet method, do not occur, since no solvent is used; etc.

For example, the porous particles P1, the particles P2 made of the conductive auxiliary agent for providing a conductivity, and the particles P3 made of a binder may be admixed and kneaded, so as to prepare a kneaded product (a kneaded product preparing step), and this kneaded product may be extended under pressure, so as to be formed into a sheet, thus making an electrode.

Figure 15:
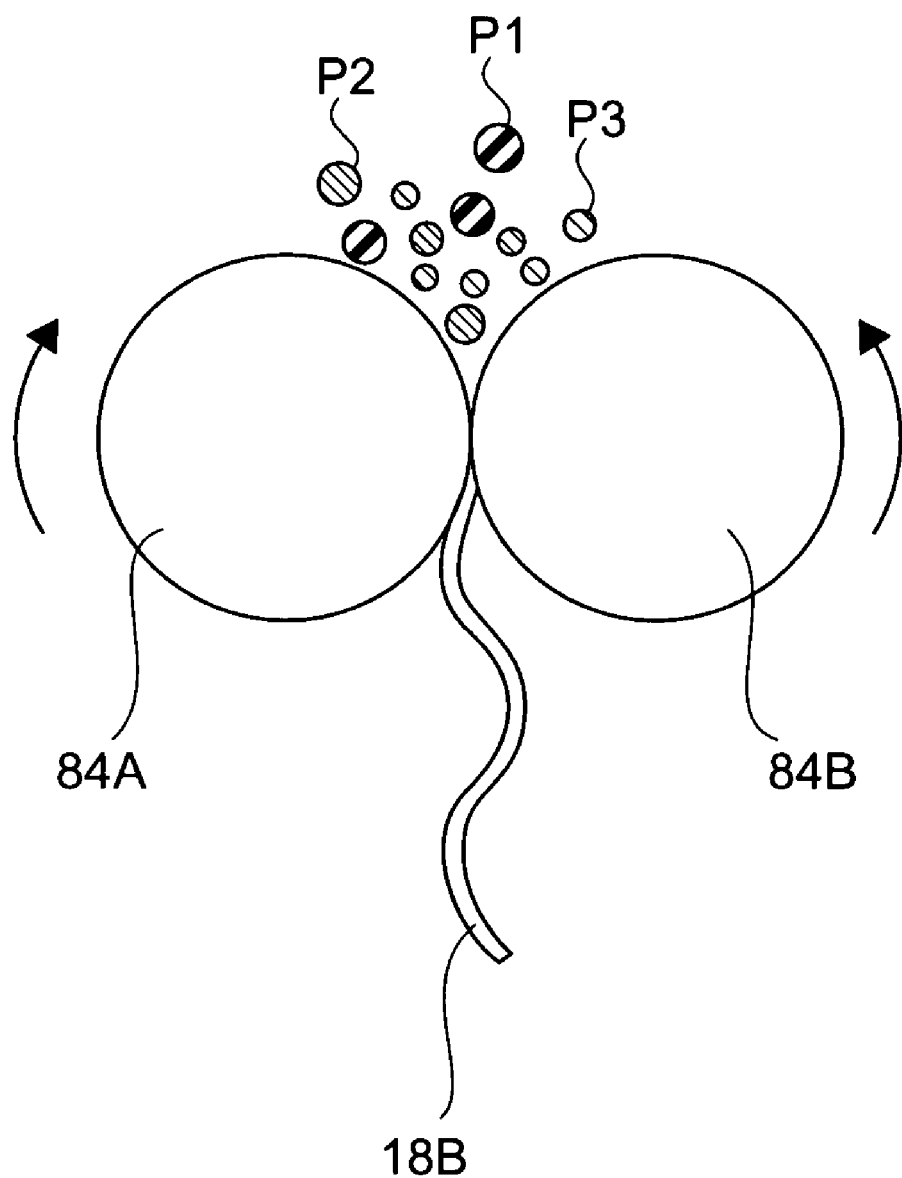
FIG. 15 is an explanatory view for explaining a step of forming an electrode sheet by a dry method.

FIG. 15 is an explanatory view for explaining the step of forming an electrode sheet by the dry method. For example, as shown in FIG. 15, the porous particles P1, the particles P2 made of the conductive auxiliary agent for providing a conductivity, and the particles P3 made of a binder are introduced between a pair of hot rolls 84A and 84B, and mixed and kneaded, while being expanded under heat and a pressure, so as to be formed into a sheet. Thus, a porous layer (sheet) 18B is obtained. Here, the surface temperature of the hot rolls 84A and 84B is preferably 60° to 120° C., whereas the pressure is preferably 10 kgf/cm to 5,000 kfg/cm in terms of linear pressure.

Then, the collector and the porous layer 18B as an active material containing layer are joined together so as to come into electric contact with each other. Thus, the porous layer 18B is disposed on the collector (a porous layer forming step).

Though the collector and the porous layer 18B as an active material containing layer may be joined together after the porous layer is formed by hot rolls as mentioned above, the collector and a constituent material for the porous layer scattered over one face of the collector may be supplied to the hot rolls, so that the forming of a sheet made of the porous layer and the electric connection between the porous layer and the collector are carried out at the same time.

Next, a method of making the case 50 will be explained. First, when constructing the first and second films from the composite package film mentioned above, known manufacturing methods such as dry lamination, wet lamination, hot-melt lamination, and extrusion lamination are used. The making of the case is preferably but not necessarily carried out in an inert gas atmosphere. However, the operation of encapsulating the matrix 60 and electrolytic solution 30 is performed in the inert gas atmosphere.

For example, a film to become a synthetic resin layer and a metal foil made of aluminum or the like which constitute the composite package film are prepared. The metal film can be prepared by expanding a metal material, for example.

Next, by way of an adhesive layer, the metal foil is attached onto the film to become a synthetic resin layer, for example, so as to yield the above-mentioned configuration of a plurality of layers, thereby making the composite package film (multilayer film). Then, the composite package film is cut into a predetermined size, so as to prepare one rectangular film.

Subsequently, as explained with reference to FIG. 2, one film 53 is folded, and the matrix 60 is arranged.

Then, in the contact parts of the first film 51 and second film 52 to be thermally fused together, portions where the first and second leads are disposed between edge part 51B of the first film 51 to be thermally fused and the edge part 52B of the second film 52 to be thermally fused are thermally fused. From the viewpoint of more reliably achieving a sufficient sealability in the case 50, it will be preferred if the surface of the anode lead 12 is coated with the adhesive mentioned above. As a consequence, between the anode lead 12 and the first film 51 and second film 52, an adhesive layer 14 made of an adhesive contributing to their adhesion is formed after the thermal fusion. Subsequently, in the same procedure as that mentioned above, surroundings of the cathode lead 22 are subjected to thermal fusion simultaneously with or separately from that mentioned above, whereby the case 50 having a sufficient sealability can be formed.

Next, in the edge part 51B of the first film 51 and the edge part 52B of the second film 52, portions other than the surroundings of the anode lead 12 and cathode lead 22 are heat-sealed (thermally fused) by a predetermined seal width with a sealer, for example.

Figure 16:
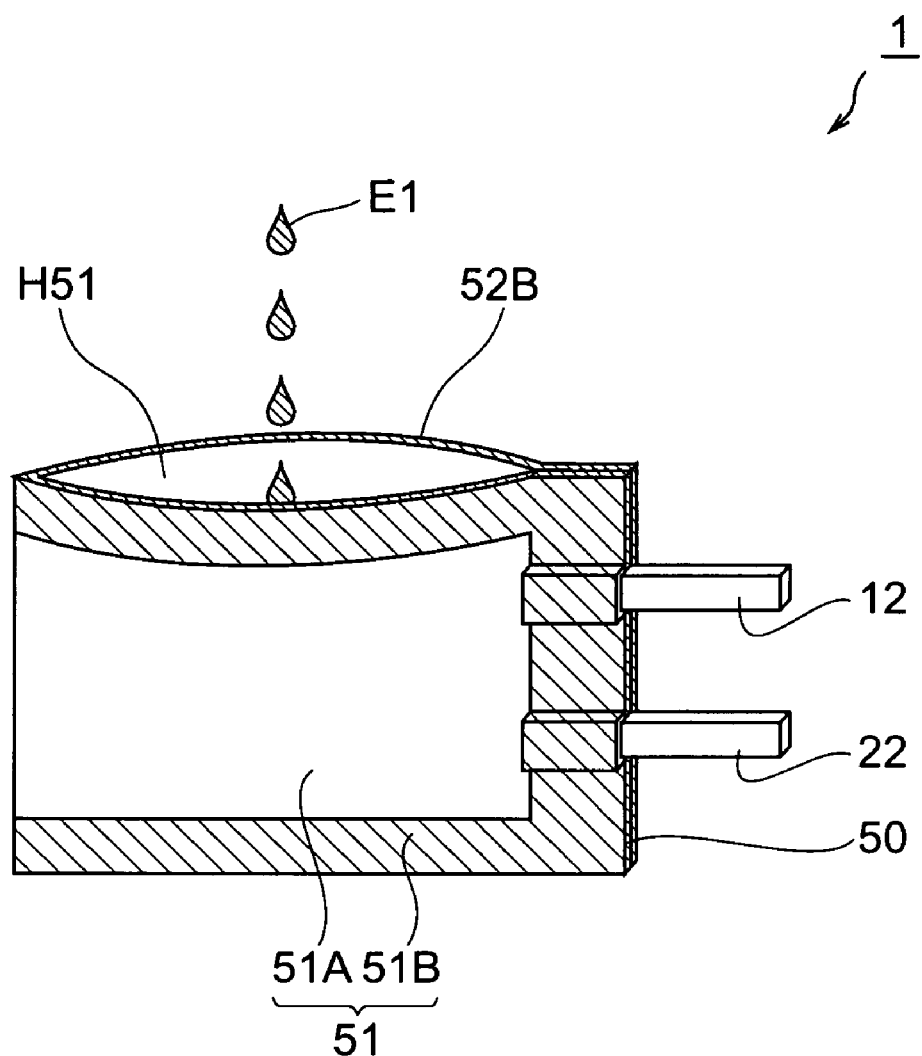
FIG. 16 is an explanatory view showing an example of a procedure of filling the case with a nonaqueous electrolytic solution.

Here, as shown in FIG. 16, a part without heat-sealing is provided in order to secure an opening H51 for injecting the nonaqueous electrolytic solution 30. This yields the case 50 having the opening H51.

Figure 17:
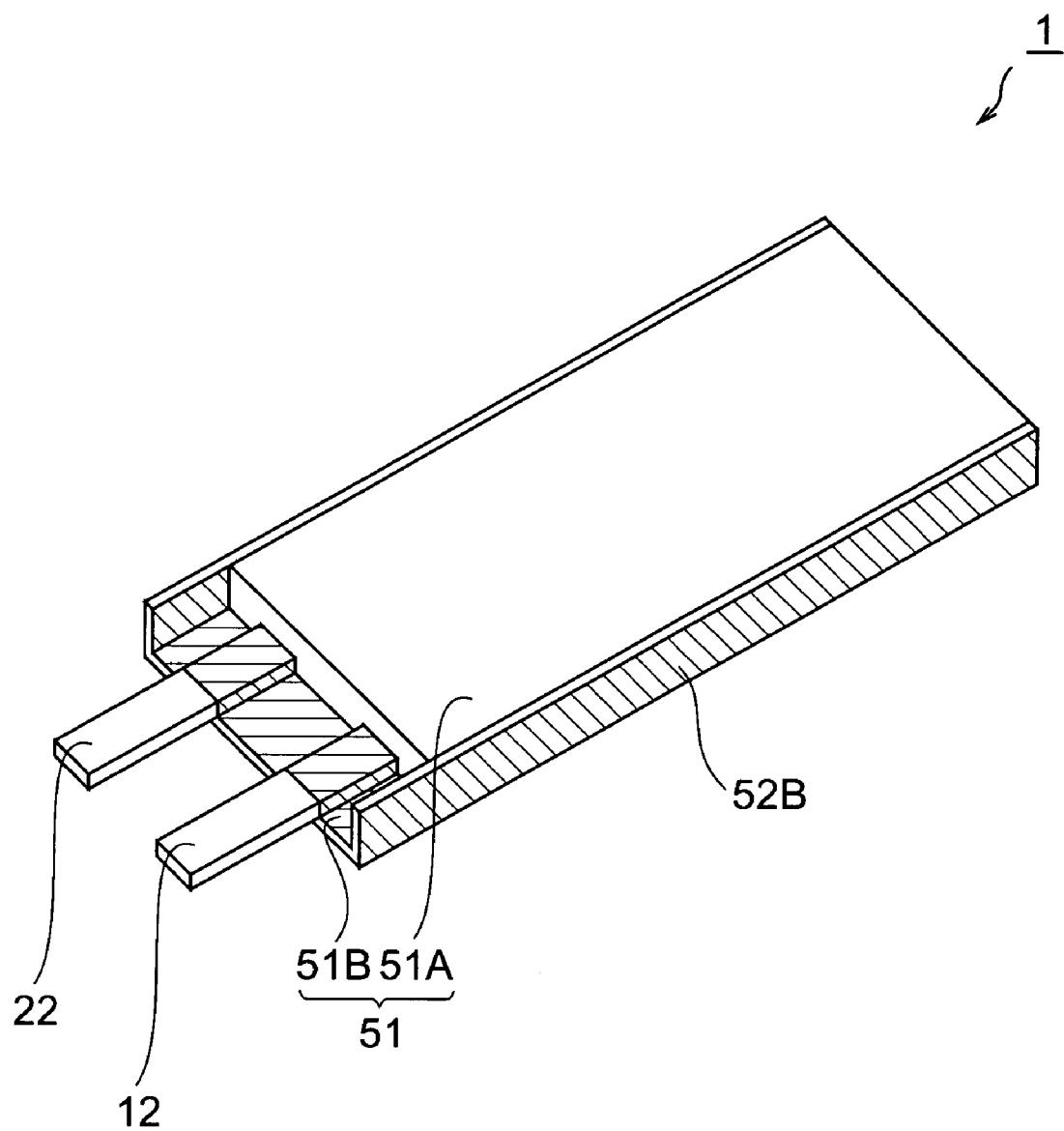
FIG. 17 is a perspective view showing the electrochemical capacitor when seal parts of the case are folded.

Then, the nonaqueous electrolytic solution 30 is injected from the opening H51 as shown in FIG. 16 in an inert gas atmosphere. E1 shown in FIG. 16 refers to a droplet of the nonaqueous electrolytic solution 30. Subsequently, using a vacuum sealer, the opening H51 of the case 50 is sealed. Further, from the viewpoint of improving the volume energy density with reference to the volume of the space where the electrochemical capacitor 1 is to be placed, the seal parts of the case 50 are folded as shown in FIG. 17. For example, the seal parts are folded so as to approach the main part 51A of the first film 51. Thus, the making of the case 50 and electrochemical capacitor 1 (electric double layer capacitor) is completed.

Though a preferred embodiment of the present invention is explained in detail in the foregoing, the present invention is not limited to the above-mentioned embodiment. For example, in the explanation of the above-mentioned embodiment, the seal parts of the electrochemical capacitor 1 may be folded, so as to attain more compact configurations. Also, though the electrochemical capacitor 1 equipped with one each of the anode 10 and cathode 20 is explained in the foregoing, it may be configured such that the anode 10 and cathode 20 are provided at least one each while the separator 40 is always positioned between the anode 10 and cathode 20.

Preferably, in the above-mentioned embodiment, the electrode manufacturing method further comprises a storing step of sealing the electrode obtained after the porous layer forming step into a case capable of storing the electrode in a closed state in an inert gas atmosphere. In this case, the irreversible capacity can be lowered, since neither moisture nor oxygen mingles therein.

Though the explanation of the above-mentioned embodiment mainly relates to a case where an electric double layer capacitor is made by the manufacturing method of the present invention, the electrochemical capacitor made by the manufacturing method of the present invention is not limited to the electric double layer capacitor. The manufacturing method of the present invention is applicable to the making of electrochemical capacitors such as pseudo-capacity capacitors, pseudocapacitors, and redox capacitors, for example.

For example, the electrode made by the manufacturing method of the present invention may have a configuration of a module in which a plurality of unit cells (each constituted by an anode 2, a cathode 3, and an electrolyte layer 4 also acting as a separator) are laminated and held in a closed state (so as to form a package) in a predetermined case.

Further, in this case, the unit cells may be arranged either in parallel or in series. Also, for example, a plurality of such modules may be electrically connected in series or in parallel, so as to construct a battery unit. An example of the battery unit is one with a series connection in which a cathode terminal of one module is electrically connected to an anode terminal of another module with a metal strip.

Figure 18:
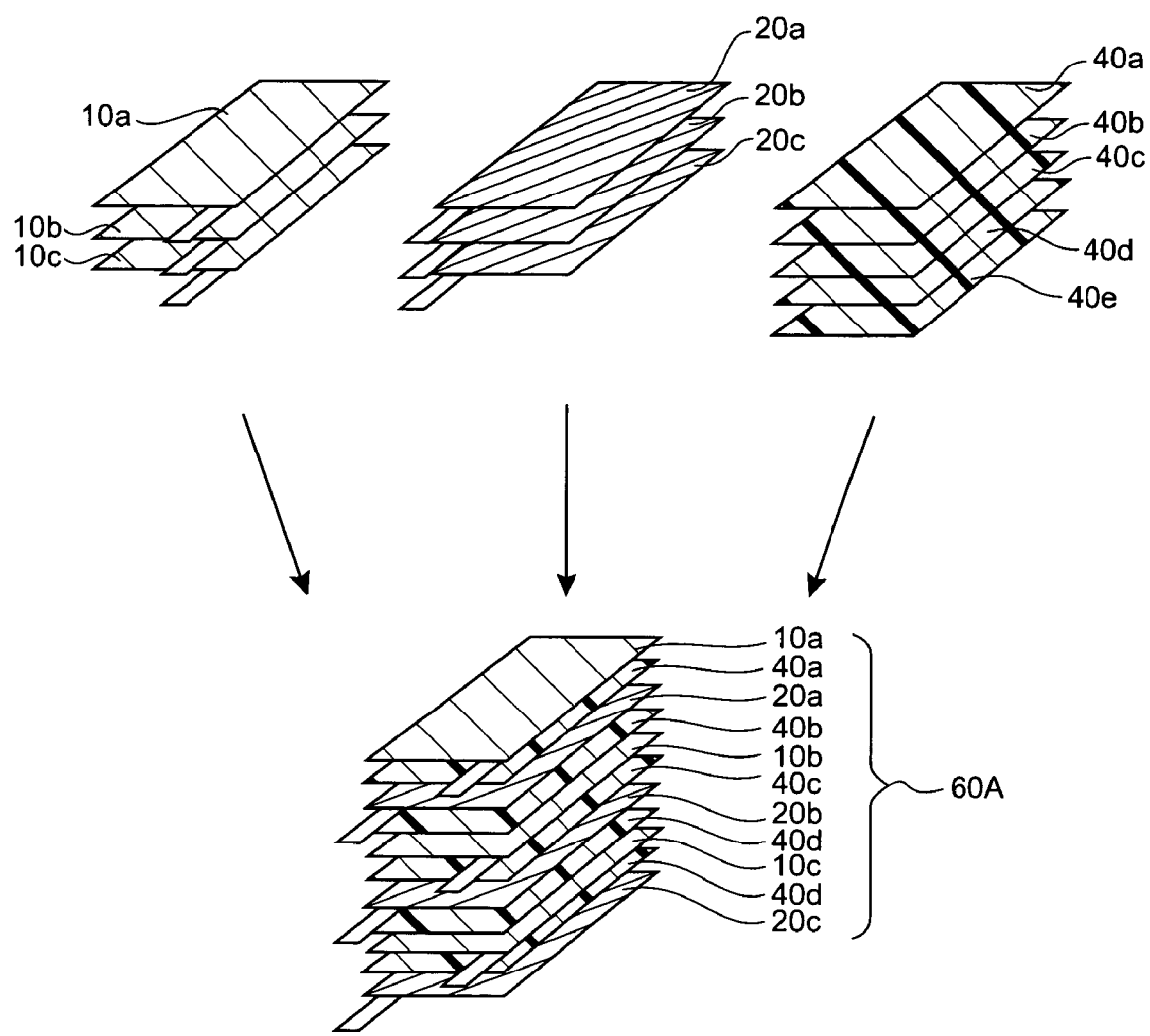
FIG. 18 is an explanatory view showing a manufacturing method for forming a laminate constituted by a plurality of electrodes and separators.

For example, in a configuration in which three anodes 10a to 10c and three cathodes 20a to 20c are alternately laminated with five separators 40a to 40e respectively interposed therebetween, as shown in FIG. 18, a laminate 60A in which the three anodes 10a to 10c and three cathodes 20a to 20c are alternately laminated with five separators 40a to 40e respectively interposed therebetween is formed. Subsequently, in an inert gas atmosphere, the laminate 60A is sealed into the case 50.

When constructing the above-mentioned module or battery unit, protection circuits and PTC similar to those provided in known batteries may further be provided if necessary.

As explained in the foregoing, the method of making an electrochemical capacitor electrode in accordance with the present invention can easily and reliably form an electrochemical capacitor electrode and an electrochemical capacitor which are excellent in reversible capacity, voltage resistance characteristics, cycle characteristics, and stability during high-temperature storage. Also, the method of making an electrochemical capacitor in accordance with the present invention can easily and reliably form an electrochemical capacitor which is excellent in reversible capacity, voltage resistance characteristics, cycle characteristics, and stability during high-temperature storage.

The invention claimed is:

1. A method of making an electrochemical capacitor electrode comprising a collector and an electronically conductive porous layer formed on the collector while keeping an electric contact therewith, the porous layer containing at least a porous particle made of a carbon material having an electronic conductivity and a binder adapted to bind the porous particle;

the method comprising a plasma processing step of subjecting a material to high-frequency thermal plasma processing in a plasma gas atmosphere so as to yield the porous particle;

wherein all the manufacturing steps subsequent to the plasma processing step are carried out in an inert gas atmosphere.

2. A method of making an electrochemical capacitor electrode according to claim 1, further comprising:

a coating liquid preparing step of preparing an electrode forming coating liquid including the porous particle obtained after the plasma processing step, the binder, and a liquid adapted to dissolve or disperse the binder; and a porous layer forming step of applying the coating liquid onto the collector and eliminating the liquid so as to form the porous layer.

3. A method of making an electrochemical capacitor electrode according to claim 1, further comprising:

a kneaded product preparing step of kneading a mixture containing the porous particle obtained after the plasma processing step and the binder so as to prepare a kneaded product for forming an electrode; and a porous layer forming step of forming a sheet from the kneaded product by using a hot roll and disposing thus obtained sheet as the porous layer on the collector.

4. A method of making an electrochemical capacitor electrode according to claim 2 or 3, further comprising a storing step of sealing the electrode obtained after the porous layer forming step into a case capable of storing the electrode in a closed state in the inert gas atmosphere.

5. A method of making an electrochemical capacitor comprising first and second electrodes opposing each other; an insulating separator disposed between the first and second electrodes so as to be adjacent thereto; a nonaqueous electrolytic solution; and a case accommodating therein the first electrode, second electrode, separator, and nonaqueous electrolytic solution in a closed state;

wherein at least one of the first and second electrodes is made by the method of making an electrochemical capacitor electrode according to one of claims 1 to 3; and wherein all the manufacturing steps are carried out in an inert gas atmosphere.

6. A method of making an electrochemical capacitor according to claim 5, wherein both of the first and second electrodes are made by the method of making an electrochemical capacitor electrode according to one of claims 1 to 3.

7. A method of making an electrochemical capacitor electrode, the method comprising:

a plasma processing step of subjecting a material made of a carbon material having an electronic conductivity to high-frequency thermal processing in a plasma gas atmosphere so as to yield a porous particle; and a porous layer forming step of forming an electronically conductive porous layer on a collector by using the porous particle and a binder adapted to bind the porous particle;

wherein the porous layer forming step is carried out in an inert gas atmosphere.

8. A method of making an electrochemical capacitor comprising first and second electrodes opposing each other; an insulating separator disposed between the first and second electrodes so as to be adjacent thereto; a nonaqueous electrolytic solution; and a case accommodating therein the first electrode, second electrode, separator, and nonaqueous electrolytic solution in a closed state;

the method comprising:

an electrode forming step of forming the first and second electrodes; and an accommodating step of accommodating the first electrode, second electrode, separator, and nonaqueous electrolytic solution such that the separator is disposed between the first and second electrodes and closing the case so as to yield the electrochemical capacitor;

wherein at least one of the first and second electrodes is made in the electrode forming step by the method of making an electrochemical capacitor electrode according to claim 1 or 7; and wherein the accommodating step is carried out in an inert gas atmosphere.

* * * * *